United States Patent [19]

Toth

[11] Patent Number: 4,775,272

[45] Date of Patent: Oct. 4, 1988

[54] DECORATIVE CAPPED WHEEL NUT AND METHOD OF MAKING SAME

[75] Inventor: John A. Toth, Orchard Lake, Mich.

[73] Assignee: Key Manufacturing Group, Inc., Southfield, Mich.

[21] Appl. No.: 25,030

[22] Filed: Mar. 12, 1987

[51] Int. Cl.⁴ ............................................. F16B 37/14
[52] U.S. Cl. .................................... 411/429; 411/376; 411/373; 10/86 C
[58] Field of Search ............... 411/429, 430, 431, 373, 411/374, 375, 376; 10/86 C

[56] References Cited

U.S. PATENT DOCUMENTS

| | | | |
|---|---|---|---|
| 154,255 | 8/1874 | Ives | 411/429 |
| 2,018,301 | 10/1935 | Ferry | 411/430 |
| 2,391,989 | 12/1942 | Luce | 411/247 |
| 3,364,806 | 1/1968 | Chaivre | 411/430 |
| 3,585,900 | 6/1971 | Chaivre | 411/430 |
| 3,955,231 | 5/1976 | Erdmann | 411/429 |
| 4,018,133 | 4/1977 | Chaivre et al. | 411/429 |
| 4,056,862 | 11/1977 | Chaivre et al. | 10/86 C X |
| 4,123,961 | 11/1978 | Chaivre et al. | 411/429 |
| 4,143,578 | 3/1979 | Becker | 10/86 C X |
| 4,275,285 | 6/1981 | Jadach | 411/430 X |
| 4,472,095 | 9/1984 | Molina | 411/430 X |
| 4,669,937 | 6/1987 | Feldman | 411/376 X |

FOREIGN PATENT DOCUMENTS 739405 2/1954 United Kingdom .

Primary Examiner—Gary L. Smith
Assistant Examiner—Curtis B. Brueske
Attorney, Agent, or Firm—Jerold I. Schneider

[57] ABSTRACT

A decorative capped wheel nut for holding a wheel on a motor vehicle where the capped wheel nut is exposed to view and to the environment. The nut has first and second ends, the first end to engage the wheel of the automobile, and a circumferential edge intermediate the first and second ends. The cap includes a side section to cover the sides of the nut insert and a top section, joined to the side section, to cover the second end of the nut insert. The opposite end of the side section terminates in a free edge, flare or flange which contacts the circumferential edge of the nut insert. The cap and nut insert are welded together at the contact between the circumferential edge of the nut insert and the free edge of the cap.

24 Claims, 2 Drawing Sheets

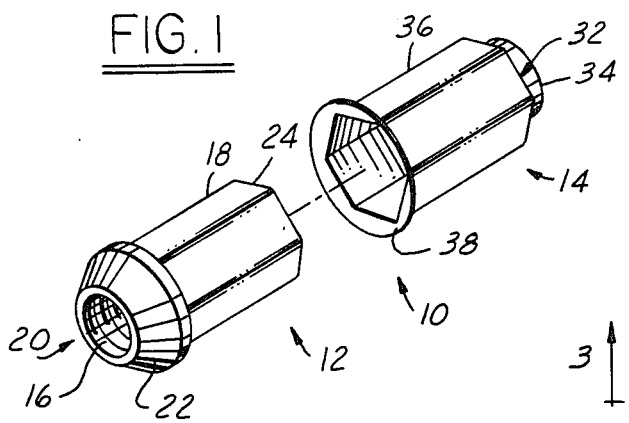
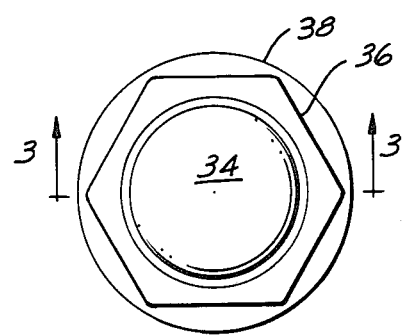
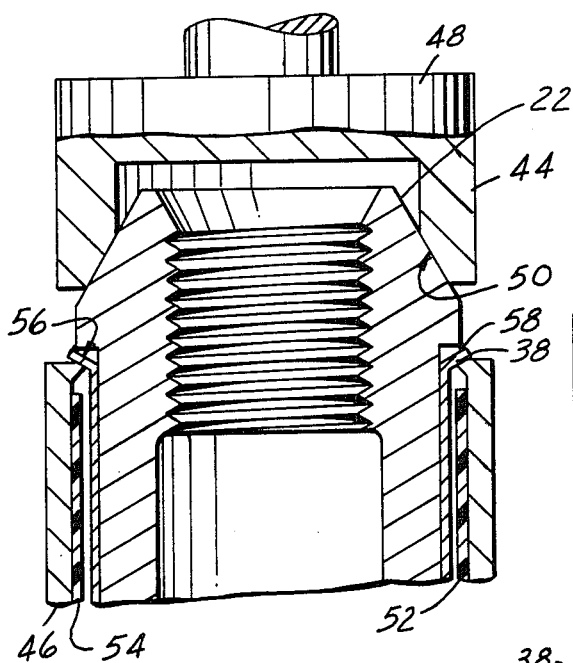
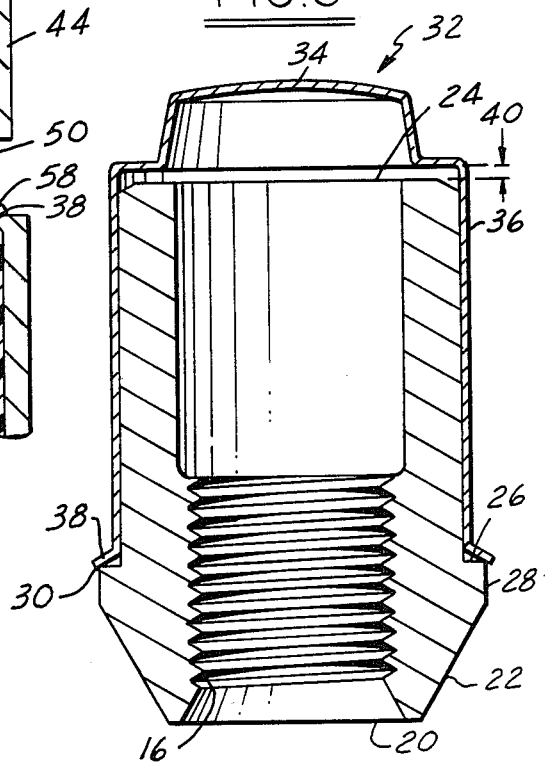

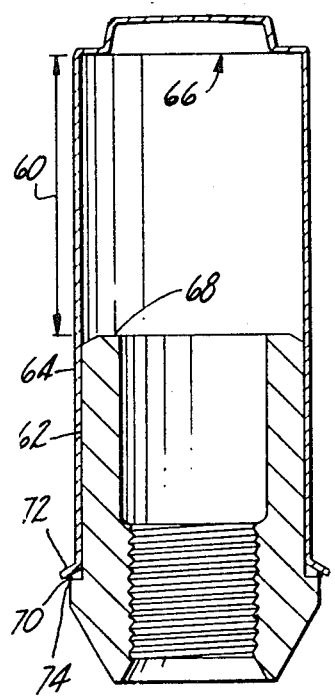
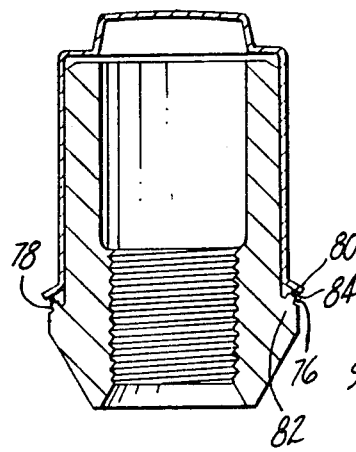
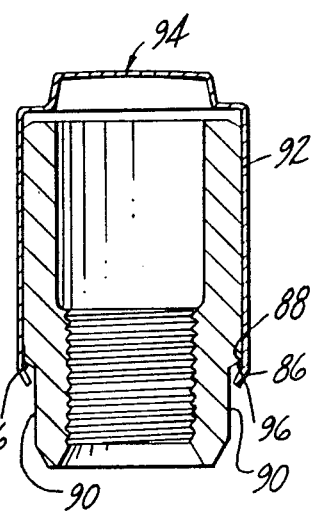
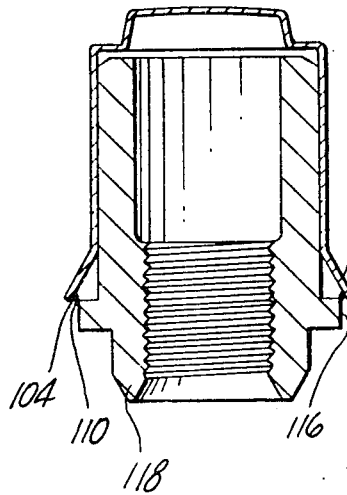
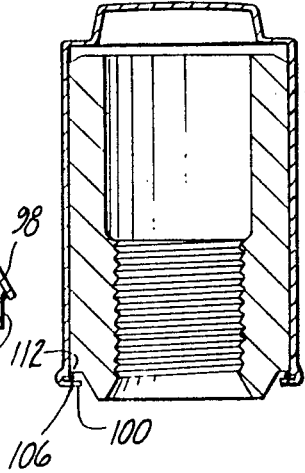
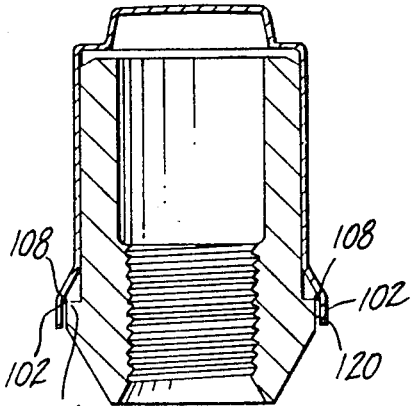

DECORATIVE CAPPED WHEEL NUT AND METHOD OF MAKING SAME

BACKGROUND OF THE INVENTION

1. Technical Field

The present invention relates to nuts, and more particularly, to decorative capped wheel nuts of the type including a nut body or nut insert having a sheet metal cap welded thereto which may be used for holding a wheel on a motor vehicle or the like where the capped wheel nut is visible and may be exposed to the environment.

2. Description of the Prior Art

Wheel nuts, capped nuts, capped wheel nuts and the like have been described in the literature for many years and are disclosed, for example, in U.S. Pats. Nos. 2,391,989, Luce; 3,364,806, Chaivre; 3,585,900, Chaivre; 4,018,133, Chaivre; 4,123,961, Jadach; 3,955,231, Erdmann; and United Kingdom Patent Specification No. 739,405, Allmanna. By way of further elaboration, U.S. Pat. No. 2,391,989 to Luce discloses a threaded locking device such as a nut having a lateral flange at the bottom. A sheet metal "cap," open at the top, has a lower lateral flange, the underside of which is welded, at the bottom of the nut, to the upper surface of the nut flange. U.S. Pat. No. 4,018,133, to Chaivre, discloses a capped wheel nut where the cap may be adhesively secured to the nut or welded to the nut. U.S. Pat. No. 154,255, to Ives, discloses a carriage axle nut provided with a cap with the cap secured to the nut by brazing. U.S. Pat. No. 4,275,285, to Jadach, discloses a capped wheel nut with the cap welded to the nut body at the wrench flats.

Particular attention is also directed to U.S. Pat. No. 4,123,961, to Jadach, which discloses a decorative nut for holding a wheel on a motor vehicle and which is exposed to view on the wheel and exposed to the environment. A nut insert or nut body is sheathed by a stainless steel cap which projects over the top of the nut insert and down the wrench flats, and the cap is welded to the nut insert. In the embodiments of FIGS. 1–9 of that patent, the weld occurs between the cap and the nut insert essentially at the top of the nut insert. In the embodiment of FIG. 10, the bottom of the nut insert or nut body has a flange, and the cap has a flange; the underside of the cap flange is welded to the upper surface of the nut body flange at the bottom of the nut body.

Several limitations have been associated with welded capped wheel nuts of the types described. One significant limitation has been that the wheel nuts are not completely sealed against moisture entering underneath the cap where corrosion may occur to peal sides of the cap away from the nut insert. Entry of moisture is facilitated by the capillary action of the water entering between the cap and the nut. One known type of capped wheel nut includes a ring shaped welding projection on the outer end of the nut body which results in a ring shaped weld between the nut body and the cap. Although such a weld may prevent moisture from entering the threads of the nut body, it nevertheless allows moisture to enter between the cap along the sides of the nut body, resulting in the cap "peeling" as mentioned above.

Also, a manufacturing limitation is the control of the welding current when relatively large lateral surface areas are welded together such as described in the aforementioned U.S. Pat. No. 4,123,961. While this problem has been reduced by the use of spot welding, such as described in U.S. Pat. No. 2,391,989, or by the provision of individual, spaced welding nibs at the top of the nut insert, neither spot welding nor individual welding nibs solves the aforementioned moisture problem. Of course, while buffing or polishing may be technologically feasible to overcome any problem of discoloration, such buffing or polishing necessarily increases the manufacturing cost of a welded capped wheel nut.

SUMMARY OF THE INVENTION

In contrast to the type of nuts described above, the decorative capped wheel nut of this invention is particularly suitable for holding wheels on motor vehicles where the capped wheel nuts may be exposed to view and to the environment. The weld effectively seals against moisture entering underneath the cap by locating the weld near the lower-extending edge of the cap. In addition, because the cap is welded near its lower-extending edge, the length of the cap may be extended and spaced apart from the end of the nut for a product commercially referred to as a long-style wheel nut.

As may be appreciated, the cap for the nut insert typically includes an end section and a side section, the side section extending over the sides of the nut insert, and the side section may terminate in a free end, which free end may be either flared outwardly, flared inwardly, or not flared at all. In its broadest form, the capped wheel nut of the present invention, for holding a wheel on a motor vehicle where the decorative wheel nut be exposed to view, may include a nut insert having a central threaded aperture, polygonal sides, a first end adapted to engage the wheel, and a second end opposite the first end. The cap for the nut insert has a side section extending over the polygonal sides of the nut insert and an end section adapted to cover the second end of the nut insert, and the side section terminates in a free end which free end is welded to the nut insert.

If the nut insert has a laterally-extending flange or shoulder, and a surface portion extending from the first end and intersecting the shoulder to define an edge, the cap free end is preferably welded to the nut insert edge. If the nut insert has an enlarged, bulbous portion adjacent the first end, then the cap free end is welded to the enlarged, bulbous portion of the nut insert. Additionally, welding nibs or projections may be optionally provided on the nut insert.

DESCRIPTION OF THE DRAWINGS

The various features, objects, benefits and advantages of the present invention will become more apparent upon reading the following detailed description of the invention taken in conjunction with the drawings. In the drawings, wherein like reference numerals identify corresponding structural components:

FIG. 1 is an exploded, perspective illustration of one embodiment of the decorative capped wheel nut of the present invention;

FIG. 2 is a plan view of the decorative capped wheel nut of the present invention;

FIG. 3 is an enlarged cross-sectional view of the decorative capped wheel nut as seen in the plane of arrows 3—3 of FIG. 2;

FIG. 4 is an enlarged, fragmentary, cross-sectional illustration of a welding fixture loaded with a nut insert and a cap illustrating the location of the weld between the cap and the nut insert;

FIG. 5 is an enlarged, cross-sectional illustration of a decorative capped wheel nut of the present invention of the "long nut" type; and FIGS. 6–10 are enlarged, cross-sectional illustrations of different forms of caps welded to nut inserts according to the principles of the present invention.

DETAILED DESCRIPTION OF THE INVENTION

Referring first to FIG. 1, a decorative capped wheel nut 10 includes a nut insert or nut body 12 and a cap 14. The nut insert 12 is an elongated member having a central threaded bore 16 and polygonal sides 18 arranged generally parallel to the elongated axis of the bore 16. It is customary, but not mandatory, for capped wheel nuts used in connection with automobiles to have six sides and thus the nut insert 12 may be referred to as a hex nut insert. Typically, when capped wheel nuts are utilized on automobiles, five spaced-apart mounting studs are provided for each wheel of the automobile, and these five spaced-apart studs, which are threaded, extend through suitable apertures in the wheel mounting rim. A first end 20 of the nut insert 12 is formed as a frusto-conical portion 22, and the frusto-conical portion may bear against the edge of the wheel rim apertures when the wheel rim is mounted on the studs. This is a conventional technique for mounting and securing a wheel rim to an automobile. The second or opposite end 24 of the nut insert 12 may be generally flat.

As illustrated in greater detail in FIGS. 1 and 3, the nut insert 12 further includes a shoulder portion 26 extending laterally outwardly from the nut insert generally intermediate the first and second ends, and frequently the shoulder is positioned at the junction of the conical portion 22 and the polygonal sides 18. More specifically, in the embodiment of FIGS. 1 and 3, the conical portion 22 extends from the first end 20 of the nut insert and may terminate in a longitudinally-extending surface 28 which intersects the shoulder 26 to thus define a circumferential edge 30. This circumferential edge 30 may also be thought of as being a corner.

Referring next to the details of cap 14, the cap may be made of stainless steel sheet metal and includes a top portion 32 adapted to generally cover the second end or top of the nut insert 24, and the top may be dome-shaped as illustrated in FIGS. 1 and 3. The cap further includes a side section 36 adapted to generally conform to and fit over the polygonal sides 18 of the nut insert. In use, a torque wrench or the like engages the sides 36 of the cap and thus the sides are frequently referred to as wrench flats. To minimize slippage, it is desired that the size and number of the wrench flats correspond to the number and size of the polygonal sides of the nut insert.

The side section 36 of the cap 14 terminates in a free edge or skirt portion 38 which in this embodiment is flared outwardly. Hence, the cap skirt may be referred to as a cap flange or flared end.

To assist in the understanding of the additional details of the present invention, it may be helpful to briefly consider the form of welded capped wheel nut having the largest market share at the present time and, for this purpose, reference may be had to the aforementioned U.S. Pat. No. 4,123,961, owned by the assignee of the present invention. In that patent, the cap is disclosed as being welded to the nut insert generally at the top or second end of the nut insert. To accomplish this, it must be understood that the length of the cap must be short enough to provide clearance between the free edge of the cap and the corresponding shoulder on the nut insert. If the cap is too long, in an axial direction, there will be no (or insufficient) contact between the second end of the nut insert and the corresponding interior of the cap to thus prevent a satisfactory weld and, if the cap is too long, it may be impossible to provide the desired weld.

Referring to FIGS. 3 and 4 of the present application, FIG. 3 illustrates the cap positioned on the nut insert such that the cap skirt or free edge or flare 38 contacts the circumferential edge 30 of the nut body. It is at this contact point where welding is to occur. Thus, there is illustrated in FIG. 3 an axial gap 40 between the second end of the nut insert 24 and the corresponding interior surface of the cap. This axial gap is illustrated in a slightly exaggerated form for ease of understanding that it is the contact between the free edge 38 of the cap, the shoulder 26 and preferably the circumferential edge 30 which limits advancement of the cap 14 from the second end 24 toward the first end 20 of the nut insert. As further illustrated in FIG. 3, the free edge 38 of the cap may extend slightly beyond the circumferential edge 30 for aesthetic purposes such that when the welded capped wheel nut is in position on an automobile wheel, persons viewing the capped wheel nut will not be able to observe any portion of the nut insert itself.

Referring next to FIG. 4, the joining or welding of the cap 14 to the nut insert 12 is diagrammatically illustrated. With the nut insert 12 positioned within the cap 14, the nut and cap are positioned within a welding fixture of the type which has upper and lower welding electrodes 44, 46 respectively. By way of general illustration and not by way of limitation, the upper electrode 44 may be part of a movable upper die or press 48 while the lower electrode 46 may be part of a fixed lower die (not shown) as is generally conventional. The lower die would be preferably fixed and the upper die movable. The electrodes themselves are removable from the respective dies such that the electrodes can be dressed, repaired or replaced. This portion of the welding mechanism, and the source of the electrical power for the welding, may comprise conventional resistance welding apparatus which, of course, includes capacitive discharge welding apparatus. The upper electrode 44 may be provided with a generally tapered or chamfered surface 50 configured to receive the conical surface 22 of the nut insert.

The lower electrode 46 is provided with an enlarged central opening 52 to receive the cap 14. The central opening may be provided with an optional, electrically-insulating ring 54 if the air gap does not prevent electrical contact between the cap and the lower electrode, except at the region where the lower electrode 46 contacts the cap flare 38.

In the embodiment of FIG. 4, the lower electrode 46 is provided with an annular contact portion 56 generally configured to conform to the size and shape of the cap flange or skirt 38 such that with the capped wheel nut positioned within the welding apparatus and force applied by moving the upper electrode toward the lower electrode, the lower electrode contacts the cap only at the cap flange 38, thus pressing or forcing the cap flange 38 against the circumferential edge 30. Upon application of welding current, a weld 58 is thus formed at the juncture of the cap flange 38 and the circumferential edge 30 of the nut insert. This weld 58 is illustrated in exaggerated form in FIG. 4.

Positioning of the weld as aforesaid provides a high-quality weld over a limited or narrow area when viewed from either the axial direction, the lateral direction (i.e., perpendicular to the axial direction) or in the direction of the angle therebetween. A full circumferential weld, of course, may be provided. Because the weld is located at the free or flared end 38 of the cap, moisture is not drawn between the nut insert and the underside of the cap.

The welding time is so short in duration, especially if capacitive discharge welding is used, that heating occurs essentially at the interface or contact between the cap flange and the nut insert, and the cap surface itself will not oxidize. The heating action does not cause any carbon in the stainless steel to migrate to the grain boundaries to thus lower corrosion resistance of the stainless steel, and the heating action from the welding is not sufficient to adversely affect the hardness of the cap. Any discoloration which might occur will not materially affect the aesthetic appearance of the decorative capped wheel nut.

Reference should now be had to FIG. 5 for an explanation of another embodiment of the present invention illustrating yet another substantial benefit. The capped wheel nut of FIG. 5 is often referred to as the long-style or type of nut. As illustrated in FIG. 5, because the axial length of the polygonal sides 60 of the nut insert is substantially less than the axial length of the sides 64 of the cap, there is a substantial axial gap 60 between the underside of the top 66 of the cap and the second end 68 of the nut insert, thus precluding welding of the cap to the nut insert at the second end of the nut insert. Nonetheless, the present invention permits welding this long type of cap to the nut insert by providing the weld 70 at the contact between the cap flange 72 and the circumferential edge 74 of the nut insert.

FIG. 6 illustrates yet another embodiment of the present invention where one or more welding nibs or welding projections 76 are provided on the shoulder 78 of the nut insert. However, in order to create a moisture tight seal between the cap and the nut body, the welding projections 76 are preferably in the form of a ring which extends continuously around the full circumference of the nut insert. In the embodiment of FIG. 6, the shoulder is not perpendicular to the longitudinal axis of the nut insert. The cap flange or skirt 80 is welded to these welding nibs 76 at 84, thus providing the benefits and advantages of the invention as heretofore described. Thus, it may be understood, by comparing the embodiment of FIG. 6 to the other embodiments, that the circumferential edge functions as a welding nib. The nut insert of FIG. 6 may be thought of as having a radially enlarged or bulbous portion 82 intermediate its first and second ends.

Referring next to FIG. 7, the cap flange 86 is flared inwardly rather than outwardly, and thus the nut insert may be configured slightly differently when compared to the nut insert of FIG. 3. The nut insert of FIG. 7 includes a circumferential edge or corner 88 defined by the intersection of the longitudinal surface 90 and the polygonal sides 92. During assembly, the cap 94 may be squeezed or crimped in position prior to welding at 96. Segmented, electrodes which move radially inwardly as part of the welding operation may be employed, although axially moving electrodes are preferred.

FIGS. 8, 9 and 10 illustrate different configuration of the cap flange or skirt 98, 100, 102 welded as at 104, 106, 108 to the nut insert circumferential edge 110, 112, 114 to demonstrate the versatility of the present invention. For example, in the embodiment of FIG. 8, the longitudinal surface 116 of the nut insert is in the form of a radial flange extending outwardly from the side of the insert at a position intermediate the polygonal sides and the conical portion 188. In the embodiment of FIG. 9, the cap flange or skirt 100 is in the form of a hem, and in the embodiment of FIG. 10, the cap flange or flare extends generally over the longitudinal surface 120.

In all embodiments of the present invention, contact at the weld area is maintained during welding such as by longitudinal (axial) force between the cap and the insert which longitudinal force is applied by the moving welding electrode.

The foregoing is a complete description of the present invention and should be read, understood and interpreted as being an exemplification rather than a limitation on the invention. The invention should be limited only be reference to the following claims.

What is claimed is:

1. A decorative capped wheel nut for holding a wheel on a motor vehicle and being of the type exposed to view on the wheel comprising:
   a nut insert having a central threaded aperture, polygonal sides, a first end adapted to engage the wheel and a second end opposite the first end, said nut insert including a shoulder having a lateral surface and including a circumferential edge defining a weld projection intermediate said first and second ends said weld projection being spaced from said polyonal sides and disposed adjacent said lateral surface; and
   a cap for said nut insert, said cap having a side section extending over the polygonal sides of the nut insert and an end section covering the second end of the nut insert, said cap including a flange extending from said side section, said flange being inclined relative to the side section and welded to said nut insert at said weld projection of the nut insert.

2. A method for assembling a decorative welded capped wheel nut for holding a wheel on a motor vehicle, the welded capped wheel nut being of the type exposed to view on the automobile wheel, comprising the steps of:
   providing a nut insert having a central threaded aperture, polygonal sides, a first end adapted to engage said wheel and a second end opposite said first end, said nut insert including a shoulder having a lateral surface and a generally circumferential edge intermediate said first and second ends, said circumferential edge being spaced from said polygonal sides and disposed adjacent said lateral surface;
   providing a cap for said nut insert, said cap having a side section, a top section at one end of the side section and a flange at the opposite end of said side section said flange being inclined relative to the side section;
   assembling said cap and nut insert together such that the nut insert second end is positioned interiorly of the cap and such that the cap flange is adjacent the nut circumferential edge;
   forcing the nut insert circumferential edge into contact with the cap flange;
   maintaining contact between the nut insert circumferential edge and the cap flange; and
   welding said cap to said nut insert at the contact between the nut insert circumferential edge and the free flange.

3. A decorative capped wheel nut for holding a wheel on a motor vehicle and being of the type exposed to view on the wheel, comprising:

a nut insert having a central threaded aperture, polygonal sides, a first end adapted to engage said wheel and a second end opposite said first end, said nut insert including a generally outwardly extending shoulder having a lateral surface and a longitudinally extending surface adjacent said first end, said longitudinally extending surface intersecting said shoulder to form essentially a projection between said polygonal sides and said first end, said projection being spaced from said polygonal sides and disposed adjacent said lateral surface; and, a cap for said nut insert, said cap having a side section extending over the polygonal sides of said nut insert and an end section covering the second end of said nut insert, said cap including a flange portion overlying said projection and being inclined relative to the side section, said flange portion being welded to said nut insert at said projection.

4. The decorative capped wheel nut of claim 3, wherein said cap flange portion is welded to said nut insert at said projection around the entire circumference of said nut insert to form a water tight seal between said nut insert and said cap.

5. The decorative capped wheel nut of claim 3, wherein said cap flange portion is inclined relative to said lateral surface.

6. The decorative capped wheel nut of claim 3, wherein said cap flange portion, said nut insert shoulder and a portion of said nut insert polygonal sides form an open area between said nut insert and said cap.

7. The decorative capped wheel nut of claim 3, wherein said cap flange portion extends laterally outward beyond said nut insert projection.

8. The decorative capped wheel nut of claim 3, wherein said nut insert shoulder and said nut insert longitudinally extending surface are normal to each other.

9. The decorative capped wheel nut of claim 3, wherein said end section of said cap is longitudinally spaced from said second end of said nut insert.

10. The decorative capped wheel nut of claim 3, wherein said cap is formed of stainless steel.

11. The decorative capped wheel nut of claim 3, wherein:

said cap side section includes a plurality of wrench flats respectively facing the polyonal sides of said nut insert, and said cap flange portion is adjacent to one end of said wrench flats and is in the shape of a continuous circular ring.

12. A decorative capped wheel nut for holding a wheel on a motor vehicle and being of the type exposed to view on the wheel, comprising:

a nut insert having a central threaded aperture, polygonal sides, a first end adapted to engage said wheel, a second end opposite said first end, and an enlarged cross sectional portion including a lateral surface and a circumferentially extending edge spaced from said polygonal sides and disposed adjacent said lateral surface; and, a cap for and adapted to be welded to said nut insert, said cap having a side section extending over the polygonal sides of said nut insert, an end section covering the second end of said nut insert, and a flange portion extending from said side section and being inclined relative to said side section, said flange portion overlying and contacting said edge around the entire circumference of said enlarged cross sectional portion, the area of contact between said flange portion and said edge being relatively small whereby to maximize the density of electrical current flow between said nut insert and said cap when an electrical potential is applied to said nut insert and said cap during electrical welding of said flange to said enlarged cross sectional area of said nut insert.

13. The decorative capped wheel nut of claim 12, wherein said cap flange portion is welded to said nut insert edge around the entire circumference of said enlarged cross sectional portion of said nut insert.

14. The decorative capped wheel nut of claim 12, wherein said nut insert edge is defined by said lateral surface and a longitudinally extending surface adjacent said first end.

15. The decorative capped wheel nut of claim 12, wherein said lateral surface at least partially defines a laterally extending shoulder on said nut insert.

16. The decorative capped wheel nut of claim 12, wherein said cap flange portion extends laterally outward beyond said nut insert edge.

17. The decorative capped wheel nut of claim 14, wherein said lateral surface and said longitudinally extending surface extend essentially normal to each other.

18. The decorative capped wheel nut of claim 12, wherein said end section of said cap is longitudinally spaced from said second end of said nut insert.

19. A decorative capped wheel nut for holding a wheel on a motor vehicle where the decorative capped wheel nut is exposed to view on the wheel, comprising:

a nut insert having a central threaded aperture, polygonal sides, a first end adapted to engage the wheel, a second end opposite said first end, and a shoulder portion, said shoulder portion being defined by a lateral surface adjacent the polygonal sides of the nut insert and terminating in an outer edge spaced from said polygonal sides; and a cap adapted to be welded to the nut insert said cap having a side section extending over the polygonal sides of the nut insert and an end section adapted to cover the second end of the nut insert, said side section extending over the polygonal nut insert sides and including a plurality of cap wrench flats respectively associated with and oppositely facing the polygonal sides of said nut insert, said wrench flats of said cap and said polygonal sides of said nut insert being disposed between said first and said second ends of said nut insert, said cap having a flange portion adjacent said first end of said nut insert and being inclined relative to said side section said flange portion overlying and being in generally line contact with said edge before said cap is welded to said nut insert;

said cap being welded to said nut insert along said line contact to form a connection fully around the perimeter of said nut insert.

20. The decorative capped wheel nut of claim 19, wherein said cap flange portion extends laterally outward beyond said edge.

21. The decorative capped wheel nut of claim 19, wherein the second end of said nut insert is longitudinally spaced from the end section of said cap.

22. A decorative capped wheel nut for holding a wheel on a motor vehicle where the decorative capped wheel nut is exposed to view on the wheel, comprising:
- a nut insert having a central threaded aperture, polygonal sides, a first end adapted to engage the wheel, a second end opposite said first end, and an intermediate portion therebetween, said intermediate portion including a lateral surface and a longitudinal surface intersecting to define a circumferential welding projection adjacent to said lateral surface and spaced from said polygonal sides; and
- a cap for the nut insert having a side section extending over the polygonal sides of the nut insert and an end section adapted to cover the second end of the nut insert, said side section extending over the nut insert sides and said cap having a flange portion adjacent said first end of said nut insert and inclined relative to said side section;
- said cap flange being welded to said nut insert at said welding projection.

23. The decorative capped wheel nut of claim 22 wherein the welding projection is a continuous ring around the full circumference of said nut insert.

24. The decorative capped wheel nut of claim 22, wherein the welding projection is a circumferential edge on said nut insert intermediate portion